US008316369B2

(12) United States Patent
Laksberg et al.

(10) Patent No.: US 8,316,369 B2
(45) Date of Patent: Nov. 20, 2012

(54) DATAFLOW COMPONENT SCHEDULING USING READER/WRITER SEMANTICS

(75) Inventors: Artur Laksberg, Redmond, WA (US); Joshua D. Phillips, Seattle, WA (US); Niklas Gustafsson, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 407 days.

(21) Appl. No.: 12/649,254

(22) Filed: Dec. 29, 2009

(65) Prior Publication Data

US 2011/0161962 A1    Jun. 30, 2011

(51) Int. Cl.
*G06F 9/46* (2006.01)
(52) U.S. Cl. ...................................... 718/102
(58) Field of Classification Search ............... 718/102
See application file for complete search history.

(56) References Cited

U.S. PATENT DOCUMENTS

| | | | |
|---|---|---|---|
| 5,175,851 A * | 12/1992 | Johnson et al. ..................... 1/1 | |
| 5,375,215 A | 12/1994 | Hanawa et al. | |
| 5,454,108 A * | 9/1995 | Devarakonda et al. ....... 718/104 | |
| 5,459,871 A | 10/1995 | Van Den Berg | |
| 5,682,537 A | 10/1997 | Davies et al. | |
| 6,009,269 A | 12/1999 | Burrows et al. | |
| 6,092,156 A | 7/2000 | Schibinger et al. | |
| 6,601,120 B1 | 7/2003 | Schimmel | |
| 6,817,009 B2 | 11/2004 | Flanagan et al. | |
| 7,165,150 B2 | 1/2007 | Alverson et al. | |
| 7,188,344 B1 * | 3/2007 | Blue ............................ 718/106 | |
| 7,316,005 B2 | 1/2008 | Qadeer et al. | |
| 7,469,403 B2 | 12/2008 | Choi et al. | |
| 2004/0205392 A1 | 10/2004 | Wu | |
| 2008/0077922 A1 * | 3/2008 | Doring .......................... 718/100 |
| 2008/0209433 A1 | 8/2008 | McKenny | |
| 2009/0193417 A1 | 7/2009 | Kahlon | |
| 2009/0328047 A1 * | 12/2009 | Li et al. ....................... 718/102 |

FOREIGN PATENT DOCUMENTS

WO    WO2005043388 A1    5/2005

OTHER PUBLICATIONS

Thought Exercise: Axum +F#: Isolation, Agents, and Message-passing in .NET—Published Date: Mar. 31, 2009 http://blogs.msdn.com/maestroteam/ (26 pages).
Stork et al., Concurrency by Default Using Permissions to Express Dataflow in Stateful Programs—Published Date: Oct. 25-29, 2009 http://www.cs.cmu.edu/~aldrich/papers/onward2009-concurrency. pdf (8 pages).
Isolation in Maestro: Isolation, Agents, and Message-passing in .NET—Published Date: 2009 http://blogs.msdn.com/maestroteam/archive/2009/02/27/isolation-in-maestro.aspx (7 pages).

(Continued)

*Primary Examiner* — Thomas Lee
*Assistant Examiner* — Xuxing Chen
(74) *Attorney, Agent, or Firm* — Workman Nydegger

(57) ABSTRACT

The scheduling of dataflow components in a dataflow network. A number, if not all, of the dataflow components are created using a domain/agent model. A scheduler identifies, for a number of the components, a creation source for the given component. The scheduler also identifies an appropriate domain-level access permission (and potentially also an appropriate agent-level access permission) for the given component based on the creation source of the given component. Tokens may be used at the domain or agent level to control access.

23 Claims, 7 Drawing Sheets

OTHER PUBLICATIONS

Axum, Microsoft's Approach to Parallelism—Published Date: Apr. 23, 2009 http://www.infoq.com/news/2009/04/Axum (2 pages).

Greenhouse et al, Assuring and Evolving Concurrent Programs: Annotations and Policy—Published Date: May 19-25, 2002http://fluid.cs.cmu.edu:8080/Fluid/fluid-publications/p453-greenhouse.pdf (11 pages).

Taming Your Sequence's Side-Effects through lEnumerable.Let—Published Date: Sep. 12, 2009 http://bartdesmet.net/blogs/bart/archive/2009/09/12/taming-your-sequence-s-side-effects-through-ienumerable-let.aspx (20 pages).

Kieburtz, Taming Effects with Monadic Typing1—Published Date: 1998 http://delively.acm.org/10.1145/290000/289428/p51-kieburtz.pdf?key1=289428&key2=9659755521&coll=GUIDE&dl=GUIDE&CFID=56555689&CFTOKEN=92779120 (12 pages).

Andrade et al., Software Synthesis from Dataflow Models for G and LabVIEW—Published Date Mar. 16, 1998 http://users.ece.utexas.edu/~bevans/courses/ee382c/projects/spring98/andrade-kovner/litsurvey.pdf (9 pages).

Ha et al., Compile-Time Scheduling of Dynamic Constructs in Dataflow Program Graphs, IEEE Transactions of Computers, vol. 46, No. 7, Published Date: Jul. 1997 http://ptolemy.eecs.berkeley.edu/publications/papers/97/compile/compile.pdf (12 pages).

Munnich, PRED-DF—A Data Flow Based Semantic Concurrency Control Protocol for Real-Time Main-Memory Database Systems—Published Date: 2000 http://ieeexplore.ieee.org/stamp/stamp.jsp?tp=&arnumber=896428&isnumber=19358 (5 pages).

Cox et al., Adding Parallelism to Visual Data Flow Programs—Published Date-2005 http://users.cs.dal.ca/~arc/publications/2-36/paper.pdf (10 pages).

Templ et al., Lock-Free Synchronization of Data Flow between Time-Triggered and Event-Triggered Activities in a Dependable Real-Time System—Retrieved Date: Oct. 14, 2009 http://embeddedcmmi.at/fileadmin/src/docs/publications/C088.pdf (6 pages).

Leung et al., Data Race: Tame the Beast,—Published Date: 2009 http://www.cs.otago.ac.nz/research/publications/oucs-2009-01.pdf (11 pages).

Nienaltowski, Efficient Data Race and Deadlock Prevention in Concurrent Object-Oriented Programs—Published Date: 2004 http://se.inf.ethz.ch/people/nienaltowski/papers/oopsla04.pdf (2 pages).

* cited by examiner

200
```
┌─────────────────────────────────┐
│   Scheduler        201          │
└─────────────────────────────────┘
```
Domain 210
| Mutable State 221 | Immutable State 222 |
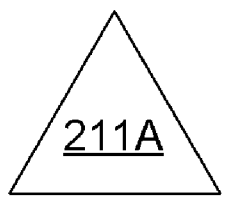  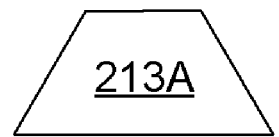
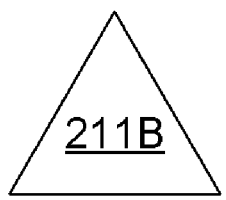  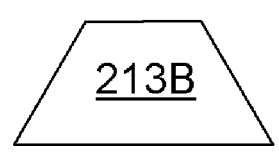
⋮∿ 211C   ⋮∿ 212C   ⋮∿ 213C
*Figure 2*

DATAFLOW COMPONENT SCHEDULING USING READER/WRITER SEMANTICS

BACKGROUND

Computing systems obtain a high degree of functionality by executing software programs. A dataflow network is a directed graph where nodes represent computations and the edges represent data flowing between the nodes. Dataflow networks are ubiquitous in software. They are relatively easy to build, reason about, and provide a degree of parallelism by allowing multiple nodes to execute in parallel.

In typical dataflow systems, execution of the nodes of the dataflow network is driven solely by the availability of the input expected by the nodes. Isolated and side-effect free dataflow networks (such as Kahn process networks) do not read or alter the external state. Conversely, non-isolated dataflow networks (such as Unix pipes) can read and/or alter the external state. Non-isolated networks have a potential of better performance due to their ability to perform in-place updates and avoid data copying. However, unrestricted access to shared mutable state is prone to a data race, a situation where a node can observe an invalid state of an object in memory, while another node is at the same time mutating the state of that object.

BRIEF SUMMARY

At least one embodiment described herein relates to the scheduling of dataflow components in a dataflow network. A number, if not all, of the dataflow components are created using a domain/agent model. A scheduler identifies, for a number of the components, a creation source for the given component. The scheduler also identifies an appropriate domain-level access permission (and potentially also an appropriate agent-level access permission) for the given component based on the creation source of the given component.

In one embodiment, each domain, and each agent, is assigned a single write token and multiple read tokens. If execution of a component affects state of a particular scope (domain or agent), and the appropriate access permission for that scope is write access, the component is allowed to execute once the write token and all read tokens are available for the scope, whereupon the write token is acquired by the component. If execution of a component affects state of a particular scope (domain or agent), and the appropriate access permission for that scope is read access, the component is allowed to execute once the write token is available for the scope, whereupon a read token is acquired by the component.

This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features can be obtained, a more particular description of various embodiments will be rendered by reference to the appended drawings. Understanding that these drawings depict only sample embodiments and are not therefore to be considered to be limiting of the scope of the invention, the embodiments will be described and explained with additional specificity and detail through the use of the accompanying drawings in which:

FIG. 2 abstractly illustrates an execution environment that includes a scheduler that schedules execution of various agents within a domain;

DETAILED DESCRIPTION

In accordance with embodiments described herein, the scheduling of dataflow components in a dataflow network is described. A number, if not all, of the dataflow components are created using a domain/agent model. A scheduler identifies, for a number of the components, a creation source for the given component. The schedule also identifies an appropriate domain-level access permission (and potentially also an appropriate agent-level access permission) for the given component based on the creation source of the given component. Tokens may be used at the domain or agent level to control access. First, some introductory discussion regarding computing systems will be described with respect to FIG. 1. Then, various embodiments of the scheduling of dataflow components will be described with reference to FIGS. 2 through 7.

Figure 1:
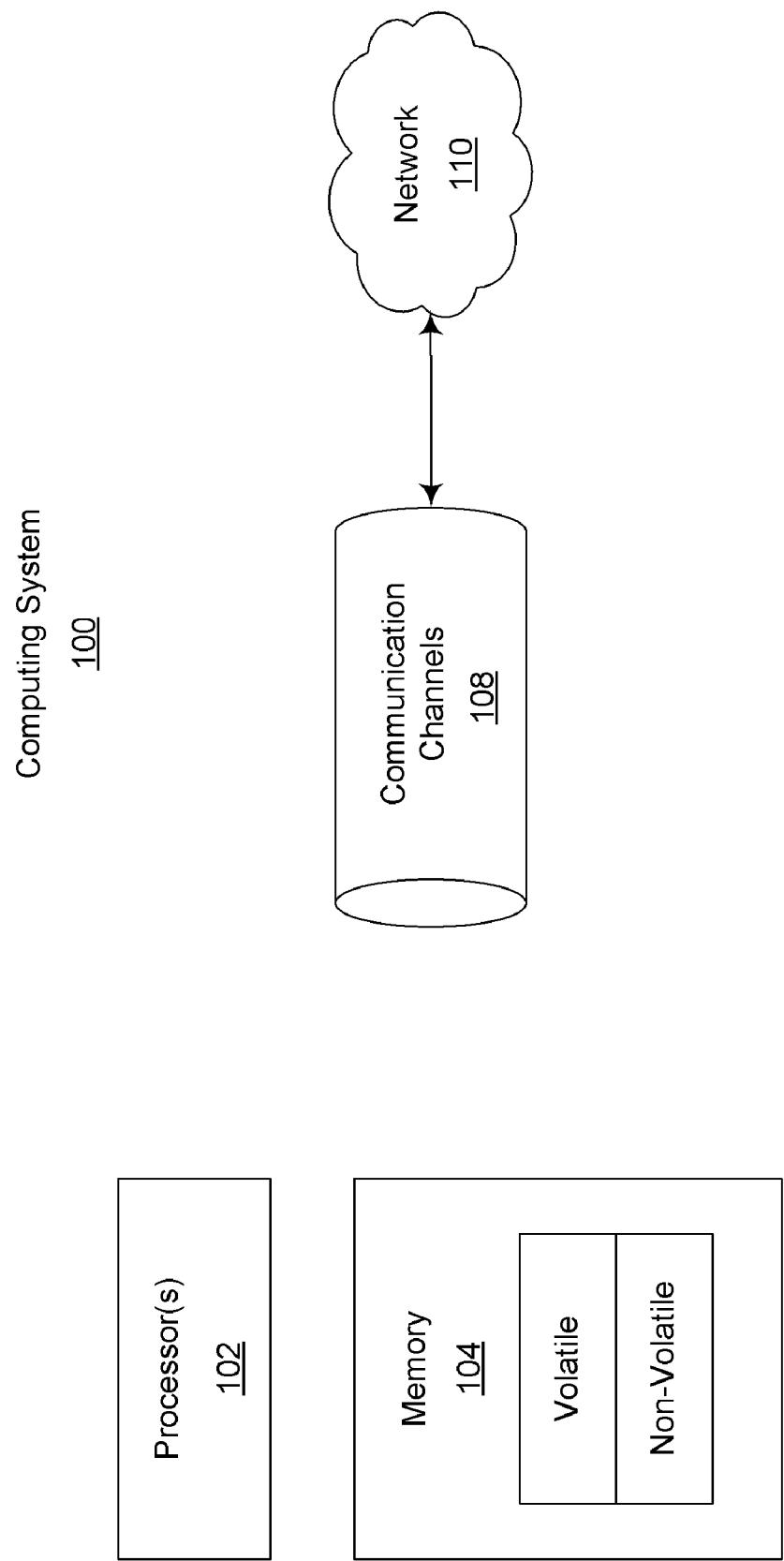
FIG. 1 illustrates an example computing system that may be used to employ embodiments described herein.

First, introductory discussion regarding computing systems is described with respect to FIG. 1. Computing systems are now increasingly taking a wide variety of forms. Computing systems may, for example, be handheld devices, appliances, laptop computers, desktop computers, mainframes, distributed computing systems, or even devices that have not conventionally considered a computing system. In this description and in the claims, the term "computing system" is defined broadly as including any device or system (or combination thereof) that includes at least one processor, and a memory capable of having thereon computer-executable instructions that may be executed by the processor. The memory may take any form and may depend on the nature and form of the computing system. A computing system may be distributed over a network environment and may include multiple constituent computing systems.

As illustrated in FIG. 1, in its most basic configuration, a computing system 100 typically includes at least one processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well. As used herein, the term "module" or "component" can refer to software objects or routines that execute on the computing system. The different components, modules, engines, and services described herein may be implemented as objects or processes that execute on the computing system (e.g., as separate threads).

In the description that follows, embodiments are described with reference to acts that are performed by one or more computing systems. If such acts are implemented in software, one or more processors of the associated computing system that performs the act direct the operation of the computing system in response to having executed computer-executable instructions. An example of such an operation involves the manipulation of data. The computer-executable instructions (and the manipulated data) may be stored in the memory 104 of the computing system 100.

Computing system 100 may also contain communication channels 108 that allow the computing system 100 to communicate with other message processors over, for example, network 110. Communication channels 108 are examples of communications media. Communications media typically embody computer-readable instructions, data structures, program modules, or other data in a modulated data signal such as a carrier wave or other transport mechanism and include any information-delivery media. By way of example, and not limitation, communications media include wired media, such as wired networks and direct-wired connections, and wireless media such as acoustic, radio, infrared, and other wireless media. The term computer-readable media as used herein includes both storage media and communications media.

Embodiments within the scope of the present invention also include a computer program product having computer-readable media for carrying or having computer-executable instructions or data structures stored thereon. Such computer-readable media (or machine-readable media) can be any available media that can be accessed by a general purpose or special purpose computer. By way of example, and not limitation, such computer-readable media can comprise physical storage and/or memory media such as RAM, ROM, EEPROM, CD-ROM, DVD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described herein. Rather, the specific features and acts described herein are disclosed as example forms of implementing the claims.

FIG. 2 illustrates an environment 200 that includes a scheduler 201 and a domain 210. The scheduler 201 may be, for example, an in-memory component that is instantiated in response to the execution of one or more computer-executable instructions of a computer program product. The creation of the domain 210 and its various constituent agents 211 through 217 may also be performed in response to the execution of such one or more computer-executable instructions. The operation and potential termination of the scheduler 201, the domain 210, and the constituent agents 211 through 217 may also be performed in response to the execution of such one or more computer-executable instructions.

The domain 210 includes mutable shared state 221 and immutable shared state 222. The mutable shared state 221 is state that may be altered (or mutated) by at least one of the agents that are defined in the domain 210. The immutable shared state 222 is state that may not be altered (i.e., is immutable) by any of the agents that are defined in the domain 210. In one embodiment, although not required, the immutable state 222 may be initialized upon creation of the domain 210.

The domain 210 is illustrated as having three different types of agents, referred to herein as writer agents, general reader agents (sometimes referred to as "reader agents"), and immutable reader agents (sometimes referred to as "no-access agents"). Each of the different types of agents is represented in FIG. 2 as having a different form. For instance, writer agents 211A and 211B are symbolized as triangles, general reader agents 212A and 212B are symbolized as circles, and immutable reader agents 213A and 213B are symbolized as trapezoids.

Although two of each type of agent are illustrated, the ellipses 211C, 212C and 213C illustrated that there may be any number of such agents. For instance, there may even be one or three or more of any of such agents. Furthermore, during execution, there may not always be at least one of each type of agent. For instance, there may be times when there are agents of just one or two of the three agent types running, though the scheduling 201 has the capacity to schedule all three agent types. Although not illustrated in FIG. 2, each of the agents, regardless of its type, may have its own internal state that it alone may access freely. In one embodiment, the domains and agents are generated using the Axum programming language, although certainly not required.

Writer agents (such as agents 211A, 211B and 211C) have read access and write access to mutable shared state 221 and have read access to immutable shared state 222. Read access with respect to mutable shared state might include, for example, copying any portion of the mutable shared state into the internal state of the agent (also referred to herein as "agent state") that the agent is free to alter internally. For instance, the agent state might be a local variable of the agent or an instance field of the agent. Similarly, read access with respect to immutable shared state might include copying any portion of the immutable shared state into the internal state of the agent that the agent is free to alter internally. Write access with respect to mutable shared state permits the copying of internal agent state (e.g., a local variable or an instance field) to a particular domain field in the mutable state, or perhaps copying content of mutable or immutable shared state to a domain field of the mutable shared state.

General reader agents (such as agents 212A, 212B and 212C—referred to in the Axum language as "reader agents") have read access to both mutable shared state 221 and immutable shared state 222, and have no write access to any of the shared state 221 or 222. Immutable reader agents (such as agents 213A, 213B and 213C—referred to in the Axum language as "no-access agents") have read access to only immutable shared state 222, and have no write access to any of the shared state 221 or 222. In one embodiment, such as in the Axum programming language, none of the writer agents, general reader agents, or immutable reader agents have any read or write access to any data outside of the domain.

The scheduler 201 is configured to schedule multiple executable agents such as the writer agents, general reader agents, and immutable reader agents. The scheduling is conducted in accordance with a policy. As part of that policy, the scheduler 201 considers the access rights of the agents. While the scheduler 201 may vary from the policy that will now be described, strict adherence to the policy now described permits for the significant reduction or even perhaps elimination of data races. Lesser adherence to the policy, however, may still provide some benefit in terms of reduction in data races.

As for the policy with respect to writer agents, the scheduler 201 ensures that at most one writer agent is accessing a portion of the mutable shared state at any given time. Furthermore, if a writer agent is to access the portion of the mutable shared state, the scheduler prohibits any reader agents from reading that same portion of the shared state. This prevents data races. In one embodiment, if one writer agent is accessing any portion of the mutable shared state, all general reader agents are prohibited from accessing any portion of the mutable shared state, even if they are not trying to access the same mutable shared state.

Even so, immutable reader agents are still permitted to read immutable state regardless of whether there are writer agents having write access to mutable state. Permitting such concurrent read access to immutable reader agents and writer agents does not result in a risk of data races since there is no risk that the immutable state will be changed by the writer agent, the writer agent not having write access to the immutable state. Thus, at least some reader agents (the immutable reader agents) may continue to execute even if there is a writer agent executing, resulting in processing improvements as compared to a policy in which all reader agents are prohibited from executing if a writer agent is executing.

As for the policy with respect to general reader agents, if a writer agent is writing to a particular portion of the mutable shared state, the scheduling prohibits any general reader agent from reading that portion mutable shared state. Once again, in one embodiment, the policy treats the mutable shared state as a whole, such that if the writer agent is accessing any portion of the mutable shared state, the entire mutable shared state is blocked to other general reader agents. If a writer agent is not writing to a portion of the mutable shared states, then the scheduler may schedule one or more general reader agents to access that portion of the mutable shared state. If treating the mutable shared state as a single whole, the scheduler may have one or more general reader agents concurrently executing if there is not a writer agent executing.

As for the policy with respect to immutable reader agents, the immutable reader agents may be permitted read access to any portion of the immutable state. By definition, the reader agents do not read from the mutable shared state. Accordingly, allowing unfettered read access to immutable state does not increase any risk of data races due to the operation of writer agents, general reader agents, or other immutable reader agents.

Stated another way, the policy ensures that for any given portion of the mutable shared state 1) at most one writer agent is accessing the given portion at any given time, 2a) does not allow any reader agents to access the given portion of the mutable shared state if a writer agent is accessing the given portion of the mutable shared state, and 2b) allows one or more reader agents to access the given portion of the mutable shared state if a writer agent is not accessing the given portion of the shared state. With respect to immutable shared state, no agent ever has write access to the immutable shared state, and all agents have read access to the immutable state.

Thus, the scheduler may be a concurrency scheduler that schedules, in some case, multiple agents to be executing concurrently using a scheduling policy that reduces or eliminates the risk of data races.

Figure 3:
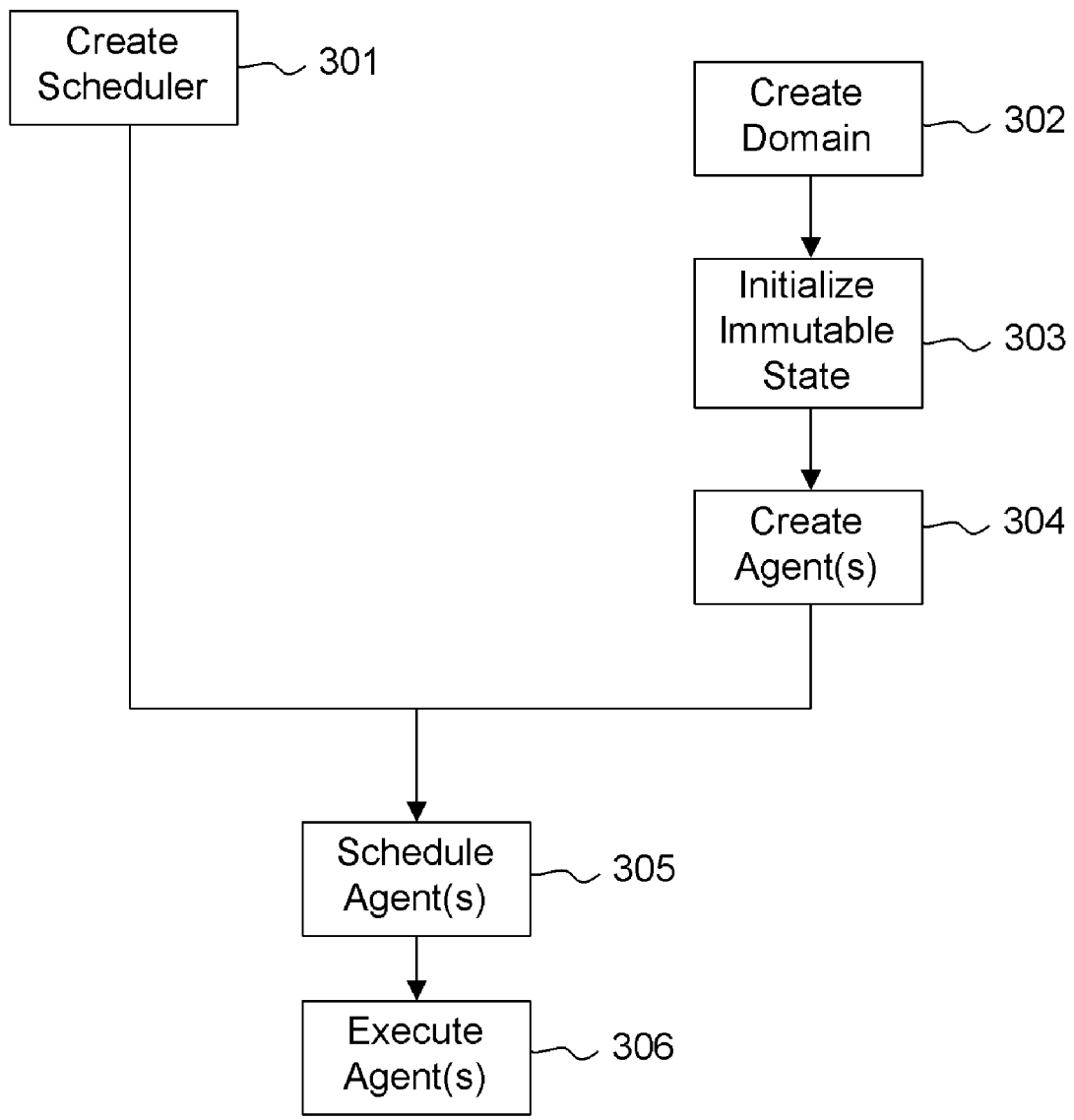
FIG. 3 illustrates a flowchart of a method for scheduling agent execution applied to the environment of FIG. 2.

FIG. 3 illustrates a flowchart of a method 300 for reducing the risk of data races in a computing system. The method 300 may be implemented within, for example, the computing system 100 of FIG. 1. The method 300 creates a scheduler (act 301) (such a scheduler 201 of FIG. 2), and creates a domain (act 302) (such as the domain 210 of FIG. 2). Optionally, upon creation of the domain, the immutable shared state (such as immutable shared state 222 in FIG. 2) is initialized (act 303). As for the mutable shared state, this may be created and edited at some points along the life of the domain. The creation of the domain may be performed in response to computer-executable code.

The domain defines a number of machine-executable agents within the domain, which are created (act 304). For instance, with respect to FIG. 2, the domain 210 defines agents 211A, 211B, 211C, 212A, 212B, 212C, 213A, 213B, and 213C. The scheduler then schedules the agents (act 305) in accordance with a scheduling policy, an example of a portion of which being described above. Other policy considerations might include execution dependencies between agents. For instance, one agent may rely upon the output of execution of another agent. The scheduled agents are executed (act 306) in the order and with the concurrency dictated by the scheduler.

The creation, scheduling, and execution of the agents may be performed continuously, with the scheduling continuously reevaluating the schedule according to policy. Accordingly, as new agents are created, and as execution of old agents completes, the scheduler may allow other agents to execute in accordance with policy.

While the principles described herein are by no means limited to the Axum program language, for the sake of completeness, an example implementation is described with respect to an Axum code example.

```
domain D
{
    int m = 1; // mutable state
    const int i = 2; // immutable state
    writer agent A : channel X
    {
        public A( ) { // agent constructor
        }
        void f( ) {
            // receive expression, execution pauses
            var x = receive(PrimaryChannel::Port);
            var y = x; // execution resumes
        }
    }
    reader agent B : channel X
    {
        public B( ) { }
    }
    agent C : channel X
    {
        public C( ) { }
    }
}
```

In this example, the domain is created with one domain field of mutable domain state (referred to as field "m" of type integer and initialized with a value of 1), and one domain field of immutable domain state (referred to as field "i" of type integer and initialized with a value of 2). The immutable state is designated in the source code using the "const" designator, whereas the mutable state lacks this designator. The construction and execution of three agents A, B, and C are also shown in the code example, with agent A being a writer agent, with agent B being a general reader agent (for example, a "reader agent" in Axum), and with agent C being an immutable reader agent (for example, a "no access agent" in Axum). Agent A is designated as a writer agent using the term "writer agent" in the code example. Agent B is designated as a general reader agent using the term "reader agent" in the code example.

Agent C is designed as an immutable reader agent using the term "agent" with no modifiers in the code example.

A compiler may verify how the agent is typed in the source code, and determine whether the actions taken (as identifiable by the source code), constitute an appropriate action.

In one embodiment, the scheduler 201 is configured to schedule execution of multiple components in a dataflow network. As previously noted, a dataflow network is a directed graph where nodes represent computations and the edges represent data flowing between the nodes. In typical dataflow systems, execution of the nodes of the dataflow network is driven solely by the availability of the input expected by the nodes. Non-isolated dataflow networks (such as Unix pipes) can read and/or alter the external state. Non-isolated networks have a potential of better performance due to their ability to perform in-place updates and avoid data copying. However, unrestricted access to shared mutable state is prone to a data race, a situation where a node can observe an invalid state of an object in memory, while another node is at the same time mutating the state of that object. The scheduler 201 reduces the risk of such a data race in an implementation in which a dataflow component may be implemented by a domain (such as domain 210 of FIG. 2) or an agent (such as domains 211, 212, or 213 of FIG. 2).

Figure 4:
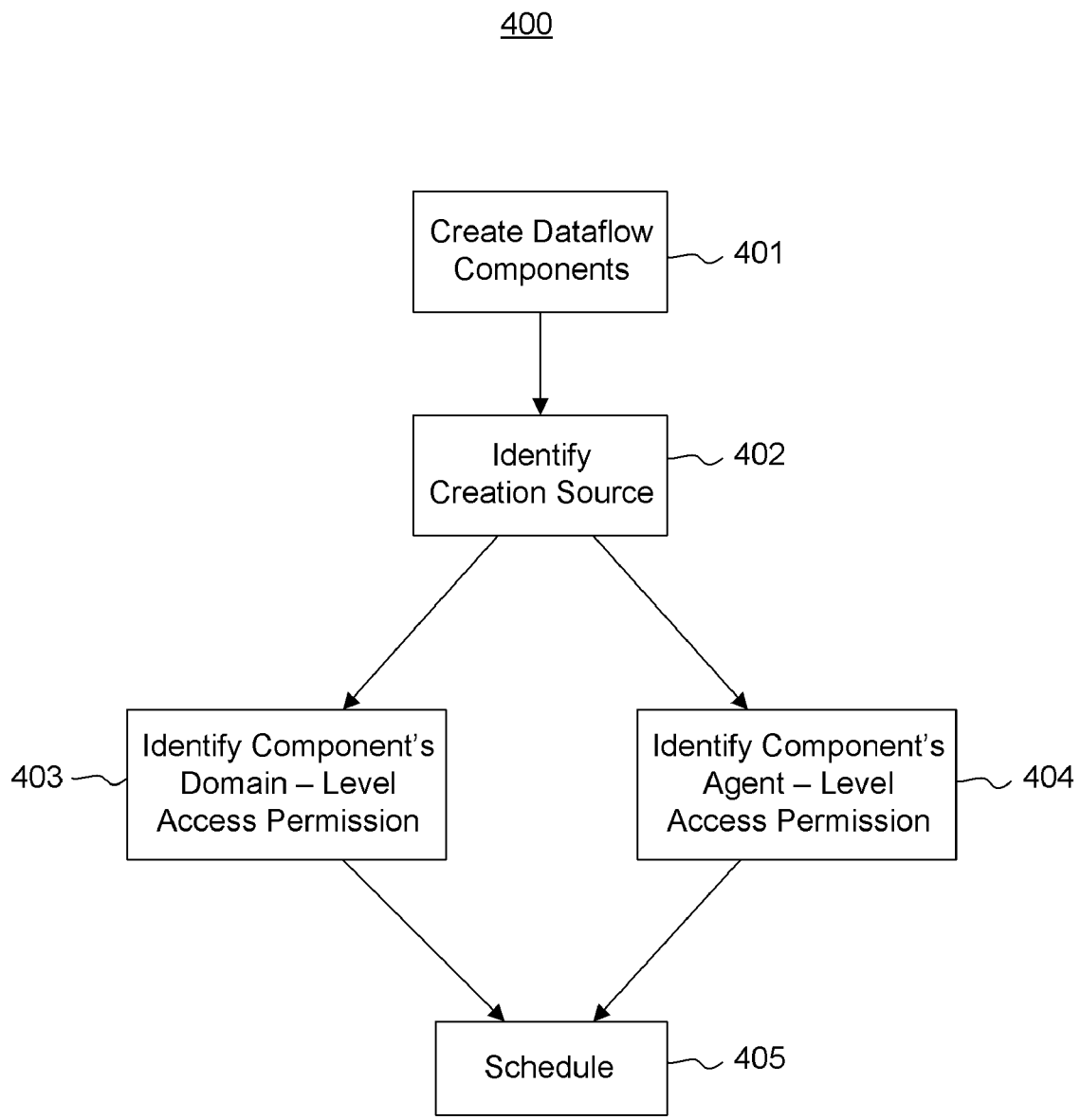
FIG. 4 illustrates a flowchart of a method for a scheduler to schedule dataflow components in a manner that reduces or avoids data races.
Figure 7:
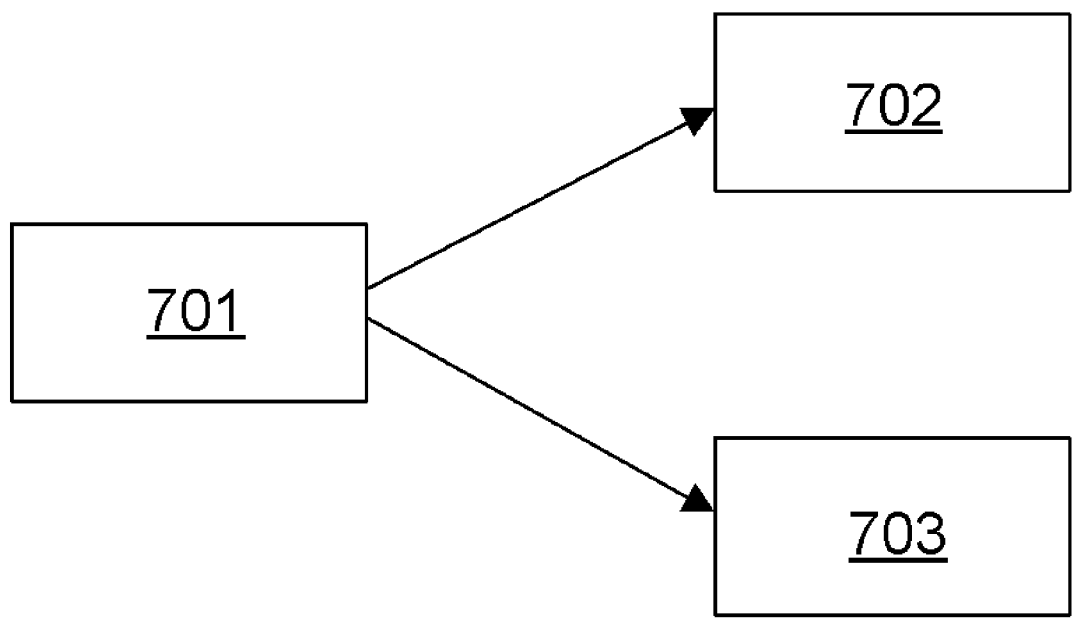
FIG. 7 illustrates a simple example of a portion of a dataflow network.

FIG. 4 illustrates a flowchart of a method 400 for a scheduler to schedule dataflow components in a manner that reduces or avoids data races. FIG. 7 illustrates an example 700 of a dataflow network that includes three components 701, 702 and 703. Component 701 is executed first and provides resulting data which is consumed by both components 702 and 703. Some of the resulting data may be shared in which case components 702 and 703 may be scheduled so as to reduce or avoid the chance of a data race with respect to the shared data. If course, components 701, 702 and 703 may be part of a larger dataflow network, though the simplified example of FIG. 7 illustrates the point of data sharing.

Some, and perhaps all, of the components of the dataflow network are created (act 401) using a domain/agent model in which data access boundaries are defined by one or more domains, and in which one or more agents are defined in each of at least one of the one or more domains. An example of such a domain/agent model was described above with respect to FIGS. 2 and 3.

Referring further to the method 400 of FIG. 4, the scheduler identifies a creation source (act 402) for each component in at least a portion of the dataflow network. The component may have been created by a domain-level method or a domain-level function. For instance, the component may have been created by the domain 210 of FIG. 2, though there is no requirement that the dataflow components be limited to creation by a single domain. There may be some components created by one domain, and others created by another domain, and so forth. A domain-level method and a domain-level function are those methods or functions, respectively, that are defined at the domain level. In one embodiment, creation sources may also include agent-level methods and agent-level functions. Agent-level methods and Agent-level functions are those methods or functions, respectively, that are defined at the agent level. One example domain/agent model is implemented by the Axum programming language.

The scheduler identifies an appropriate domain-level access permission for each of the components based on the creation source of the given component (act 403). The domain-level access permission defines access rights to shared data of the domain in which the component was created.

Figure 5:
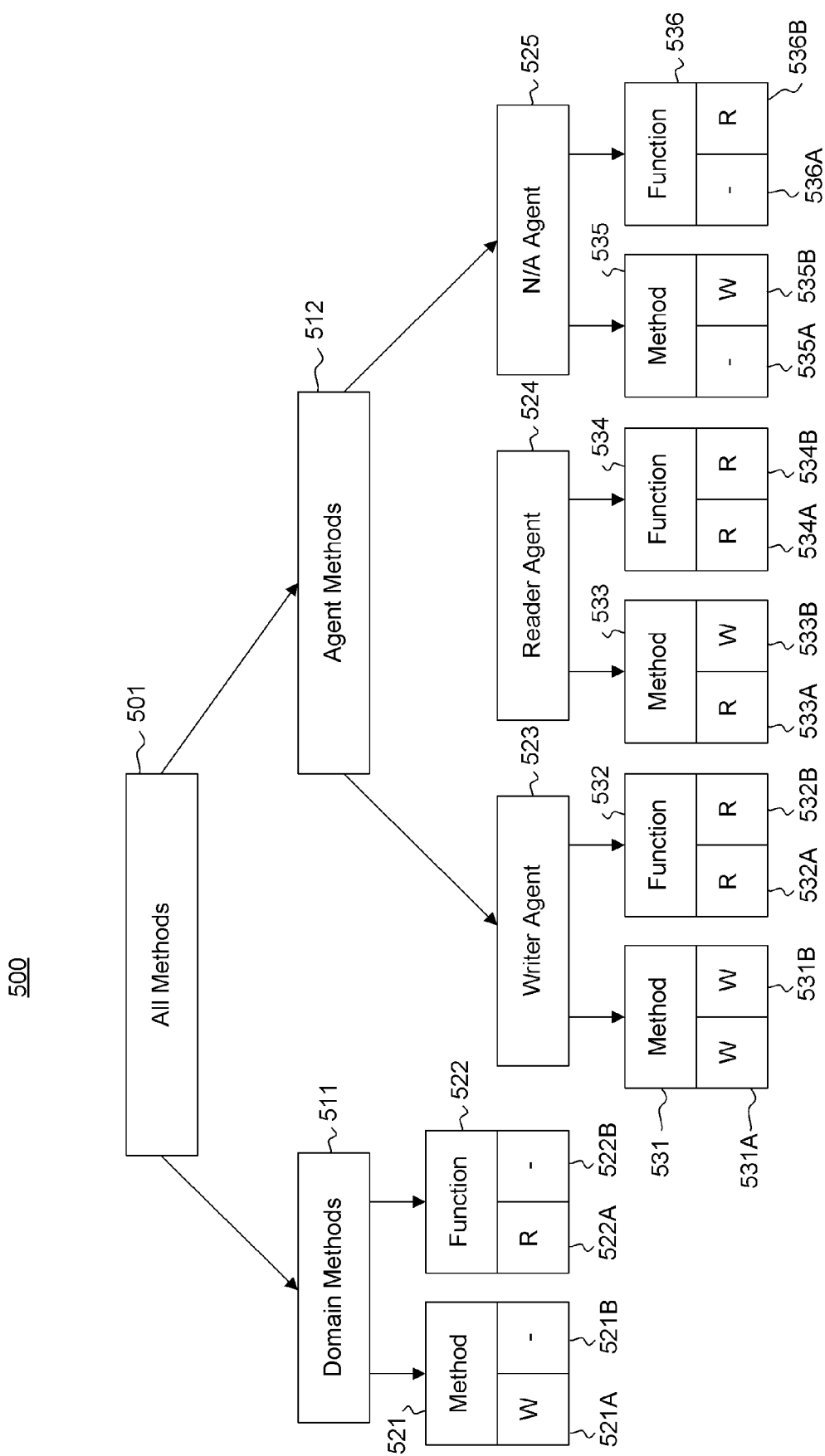
FIG. 5 illustrates a decision policy tree for determine domain-level access permissions and agent-level access permissions for dataflow components.

FIG. 5 illustrates a decision policy tree 500 for determining domain-level access permissions and agent-level access permissions. Parent node 501 is titled "All Methods" and includes all methods and functions that may be used to create a component in a domain/agent model. Intermediate node 511 is titled "Domain Methods" and is relevant to all domain-level methods and domain-level functions. Leaf node 521 is titled "Methods" and is relevant to domain-level methods, but not domain-level functions. Leaf node 521 includes section 521A (left) and section 521B (right). Each leaf node includes a left and right section, the left section being descriptive of the domain-level access permission, and the right section being descriptive of the agent-level access permission. Thus, node 521A indicates that if the creation source is a domain-level method, the scheduler determines that the appropriate domain-level access permission is write access (represented by W). On the other hand, node 522A indicates that if the creation source is a domain-level function, the scheduler determines that the appropriate domain-level access permission is read access (represented by R).

Intermediate node 512 is relevant to all agent-level methods and functions. Node 523 is relevant to all agent-level methods and functions invoked by a writer agent. Node 531 is relevant to all agent-level methods invoked by a writer agent. Node 531A represents that the appropriate domain-level access permission is write access if the agent-level method is implemented by a writer agent. Node 532 is relevant to all agent-level functions invoked by a writer agent. Node 532A represents that the appropriate domain-level access permission is read access if the agent-level function is implemented by a writer agent.

Node 524 is relevant to all agent-level methods and functions invoked by a reader agent. Node 533 is relevant to all agent-level methods invoked by a reader agent. Node 533A represents that the appropriate domain-level access permission is read access if the agent-level method is implemented by a reader agent. Node 534 is relevant to all agent-level functions invoked by a reader agent. Node 534A represents that the appropriate domain-level access permission is read access if the agent-level function is implemented by a reader agent.

Node 525 is relevant to all agent-level methods and functions invoked by an immutable reader agent. Node 535 is relevant to all agent-level methods invoked by an immutable reader agent. Node 536 is relevant to all agent-level functions invoked by an immutable reader agent. Node 535A and 536A simply represent that no access permissions at all are granted to the mutable shared data of the domain in the case of components created using methods or functions of an immutable reader agent.

Referring back to FIG. 4, the scheduler also determines an appropriate agent-level access permission (act 404) based on the creation source. If the component was created by a domain-level method or function, nodes 521B and 522B represent that the issue of agent-level access permissions is moot since agent-level data is not accessed by the component.

If the creation source is an agent-level method, the appropriate agent-level access permission is write access, regardless of whether the creation source is a writer agent (see "W" in node 531B), a reader agent (see "W" in node 533B), or an immutable reader agent (see "W" in node 535B). If the creation source is an agent-level function, the appropriate agent-level access permission is read access, regardless of whether the creation source is a write agent (see "R" in node 532B), a reader agent (see "R" in node 534B), or an immutable reader agent (see "R" in node 536B).

The domain-level access permission for a given component is enforced whenever the given component is to access mutable shared domain state. The agent-level access permission for a given component is enforced whenever a given component is to access agent-level state. Components that are defined at the domain-level do not access agent-level state, as represented by nodes 521B and 522B of FIG. 5.

Referring back to FIG. 4, once the domain-level access permission and the agent-level access permission is determined, the scheduler may determine, for any two components, whether the two components may execute concurrently (act 405) given that they operate on the same data. In a situation in which they do not operate on the same data, they can execute concurrently.

Figure 6:
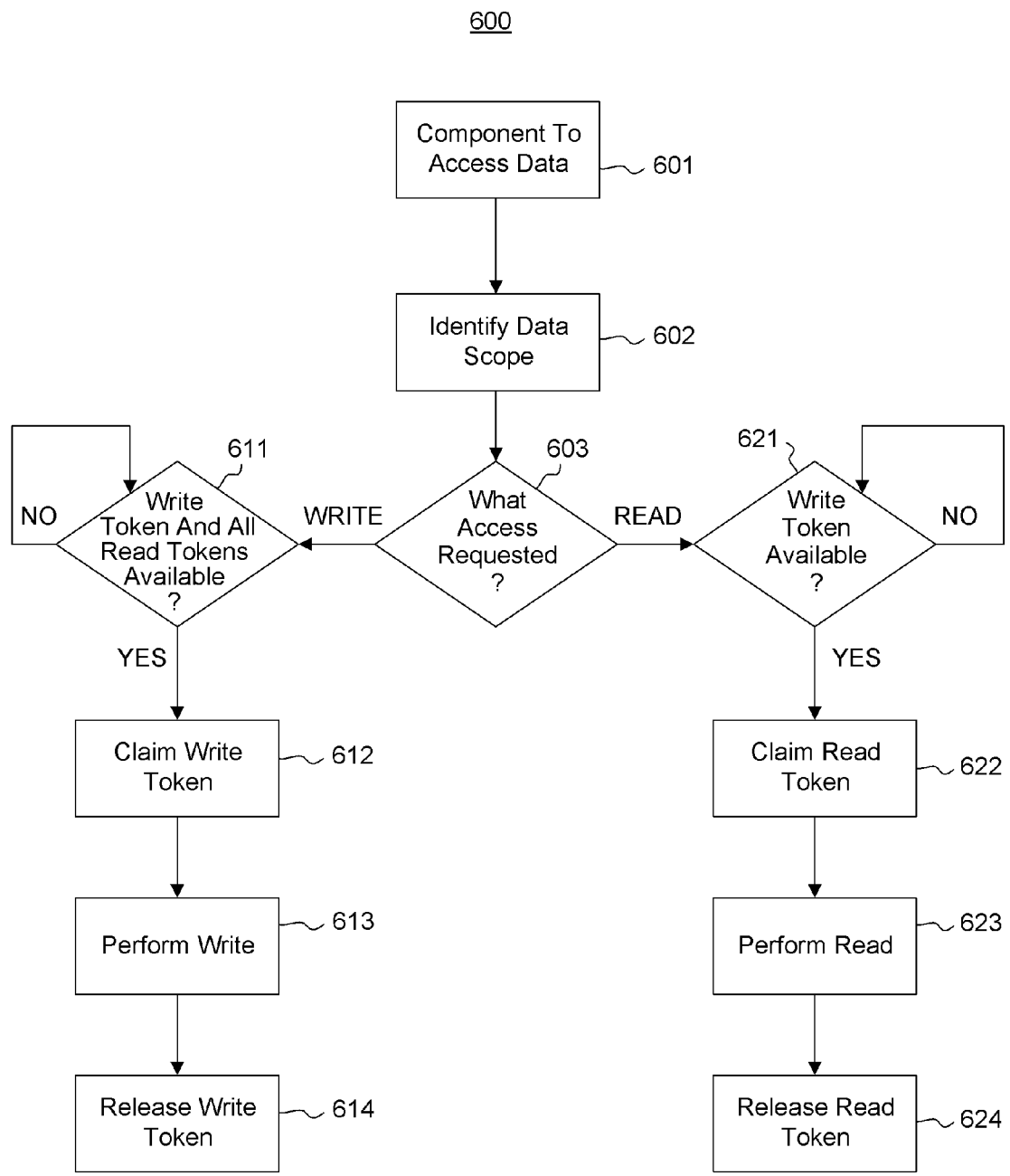
FIG. 6 illustrates a flowchart of a method for scheduling using tokens.

In one embodiment, this schedule management is accomplished with the use of tokens. Specifically, each data scope (e.g., a domain or an agent) has one write token, and multiple read tokens. For instance, each domain has a domain write token, and multiple domain read tokens. Each agent has an agent write token, and multiple agent read tokens. FIG. 6 illustrates a flowchart of a method 600 for scheduling using tokens in this context. The method 600 is evaluated using the appropriate scoped access permission based on the data scope being sought. For instance, if the component seeks access to mutable shared domain data, the domain-level access permission used evaluated. If the component seeks access to agent-level data, the domain-level access permission is evaluated.

Upon determining that a component is to access data (act 601), the scope of the data is identified (act 602), whether the data is domain data or agent data. If the appropriate access permission (domain-level access permission in the case of domain data being accessed, or agent-level access permission in the case of domain data being accessed) is write access (WRITE in decision block 603), it is determined whether the write token and all read tokens are available for the data (decision block 611). If they are not (NO in decision block 611), this means that there may be a component already writing to the data and/or there may be one or more components reading from the data. Accordingly, the data is not ready to be written to, and the component waits until the writer token and all read tokens are available for the data (YES in decision block 611). At that point, the component claims the write token for the data (act 612), which gives the component permission to write to the data (act 613), while preventing other components from writing to, or reading from, the data. Once the component is finished writing to the data, the write token for the data may be released (act 614).

If the appropriate access permission is read access (READ in decision block 603), it is determined whether the write token is available for the data (decision block 621). If it is not (NO in decision block 621), this means that there may be a component already writing to the data. Accordingly, the data is not ready to be read from yet, and the component waits until the writer token is available for the data (YES in decision block 621). At that point, the component claims the read token for the data (act 622), which gives the component permission to read from the data (act 623), while preventing other components from writing to the data. Once the component is finished reading from the data, the reader token for the data may be released (act 624).

Accordingly, the principles described herein reduce or prevent opportunity for data races in a dataflow network in which multiple components are created using a domain/agent model. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer program product comprising one or more physical computer-readable storage media having thereon computer-executable instructions that, when executed by one or more processors of the computing system, cause the computing system to instantiate a scheduler,
   the scheduler configured to schedule execution of a plurality of components in a dataflow network, each of the plurality of components being created using a domain/agent model in which data access boundaries are defined by one or more domains, and in which at least one of the one or more domains includes a plurality of agents configured to access a mutable shared state and an immutable shared state of shared data of the at least one domain, the plurality of agents including a writer agent, a general reader agent and an immutable reader agent,
   the writer agent having read access and write access to the mutable shared state and read access to the immutable shared state,
   the general reader agent having read access to the mutable shared state and the immutable shared state, and
   the immutable reader agent only having read access to the immutable shared state,
   the scheduler configured to identify, for each of the plurality of components, a creation source for the given component, possible creation sources including at least an agent-level method or an agent level function which is implemented by either the writer agent, the reader agent or the immutable reader agent;
   the scheduler configured to identify, for each of the plurality of components, an appropriate domain-level access permission for the given component based on the creation source of the given component and based on whether the creation source was implemented by the writer agent, the reader agent or the immutable reader agent; and
   the scheduler configured to determine, based at least on the identified appropriate domain-level access permission for at least two of the plurality of components, whether a particular component may concurrently execute with one or more other components of the plurality of components.

2. The computer program product in accordance with claim 1, wherein if the creation source is an agent-level method,
   the scheduler determines that the appropriate domain-level access permission is write access if the agent-level method is implemented by a writer agent,
   the scheduler determines that the appropriate domain-level access permission is read access if the agent-level method is implemented by a reader agent, and
   the scheduler determines that the appropriate domain-level access permission is no access if the agent-level method is implemented by a no-access agent.

3. The computer program product in accordance with claim 1, wherein if the creation source is an agent-level function,
   the scheduler determines that the appropriate domain-level access permission is read access if the agent-level function is implemented by a writer agent,
   the scheduler determines that the appropriate domain-level access permission is read access if the agent-level function is implemented by a reader agent, and the scheduler determines that the appropriate domain-level access permission is no access if the agent-level function is implemented by a no-access agent.

4. The computer program product in accordance with claim 1, the scheduler further configured to identify, for each of the plurality of components, an appropriate agent-level access permission for the given component based on the creation source of the given component.

5. The computer program product in accordance with claim 4, wherein if the creation source is an agent-level method,
the scheduler determines that the appropriate agent-level access permission is write access regardless of whether the agent-level method is implemented by a write agent, a reader agent, or a no-access agent.

6. The computer program product in accordance with claim 5, wherein if the creation source is an agent-level function,
the scheduler determines that the appropriate agent-level access permission is read access regardless of whether the agent-level method is implemented by a write agent, a reader agent, or a no-access agent.

7. The computer program product in accordance with claim 1, wherein each of the one or more domains has a corresponding write token and a plurality of read tokens.

8. The computer program product in accordance with claim 7, wherein the scheduler determines whether a particular component may concurrently execute with one or more other components of the plurality of components by performing the following:
an act of determining that the appropriate domain-level access permission is write access; and
an act of claiming the write token for use by the particular component once the write token and all read tokens for the domain become available.

9. The computer program product in accordance with claim 7, wherein the scheduler determines whether a particular component may concurrently execute with one or more other components of the plurality of components by performing the following:
an act of determining that the appropriate domain-level access permission is read access; and
an act of claiming the read token for use by the particular component once the write token for the domain becomes available.

10. The computer program product in accordance with claim 1, wherein the scheduler is further configured to identify an appropriate agent-level access permission for each of the plurality of components, each of the one or more components has a corresponding write token and a plurality of read tokens.

11. The computer program product in accordance with claim 10, wherein the scheduler determines whether a particular component may concurrently execute with one or more other components of the plurality of components by performing the following:
an act of determining that the appropriate agent-level access permission is write access; and
an act of claiming the write token for use by the particular component once the write token and all read tokens for the component become available, wherein a read token taken by a reader only becomes available after the reader finishes reading.

12. The computer program product in accordance with claim 10, wherein the scheduler determines whether a particular component may concurrently execute with one or more other components of the plurality of components by performing the following:
an act of determining that the appropriate agent-level access permission is read access; and
an act of claiming the read token for use by the particular component once the write token for the component becomes available.

13. The computer program product in accordance with claim 1, wherein the plurality of components in a dataflow network comprises less than all of the components in the dataflow network.

14. The computer program product of claim 1, wherein the scheduler determines that concurrent execution is permissible and wherein the concurrent execution includes accessing immutable state by one of the readers, even when the writer is accessing the mutable state.

15. The computer program product of claim 1, wherein the possible creation sources also include domain level method and a domain level function.

16. The computer program product in accordance with claim 15, wherein if the creation source is a domain-level method, the scheduler determines that the appropriate domain-level access permission is write access, wherein if the creation source is a domain-level function, the scheduler determines that the appropriate domain-level access permission is read access.

17. A method for scheduling a plurality of components in a dataflow network, the method comprising
an act of using a domain/agent model to formulate a plurality of components in a dataflow network, the plurality of components including at least some of all of the components in the dataflow network, the domain/agent model being a model in which data access boundaries are defined by one or more domains, and in which at least one of the one or more domains includes a plurality of agents configured to access a mutable shared state and an immutable shared state of shared data of the at least one domain, the plurality of agents including a writer agent, a general reader agent and an immutable reader agent,
the writer agent having read access and write access to the mutable shared state and read access to the immutable shared state,
the general reader agent having read access to the mutable shared state and the immutable shared state, and
the immutable reader agent only having read access to the immutable shared state;
an act of identifying, for each of the plurality of components, a creation source for the given component, possible creation sources including an agent-level method or an agent level function which is implemented by either the writer agent, the reader agent or the immutable reader agent;
an act of identifying, for each of the plurality of components, an appropriate domain-level access permission for the given component based on the creation source of the given component and based on whether the creation source was implemented by the writer agent, the reader agent or the immutable reader agent; and
an act of determining, based at least on the identified appropriate domain-level access permission for at least two of the plurality of components, whether a particular component may concurrently execute with one or more other components of the plurality of components.

18. The method in accordance with claim 17, wherein the possible creation sources also include level method and a domain level function, wherein if the creation source is a domain-level method, the appropriate domain-level access permission is write access, and wherein if the creation source is a domain-level function, the appropriate domain-level access permission is read access.

19. The method in accordance with claim 18,
wherein if the creation source is an agent-level method,
the scheduler determines that the appropriate domain-level access permission is write access if the agent-level method is implemented by a writer agent,
the scheduler determines that the appropriate domain-level access permission is read access if the agent-level method is implemented by a reader agent, and
the scheduler determines that the appropriate domain-level access permission is no access if the agent-level method is implemented by a no-access agent,
wherein if the creation source is an agent-level function,
the scheduler determines that the appropriate domain-level access permission is read access if the agent-level function is implemented by a writer agent,
the scheduler determines that the appropriate domain-level access permission is read access if the agent-level function is implemented by a reader agent, and
the scheduler determines that the appropriate domain-level access permission is no access if the agent-level function is implemented by a no-access agent.

20. A computer program product comprising one or more physical computer-readable storage media having thereon computer-executable instructions that, when executed by one or more processors of the computing system, cause the computing system to instantiate a scheduler that schedules execution of a plurality of components in a dataflow network,
the scheduler configured to identify, for each of the plurality of components, a creation source for the given component, possible creation sources including at least a domain-level method, a domain-level function, an agent-level method, and an agent-level function, and if an agent-level method or function, the type of agent that implemented that creation source, possible agent types include writer agent, reader agent, and no-access agent;
the scheduler configured to identify, for each of at least some of the plurality of components, an appropriate domain-level access permission for the given component based on the creation source of the given component; and
wherein if the creation source is a domain-level method, the scheduler determines that the appropriate domain-level access permission is write access,
wherein if the creation source is a domain-level function, the scheduler determines that the appropriate domain-level access permission is read access,
wherein if the creation source is an agent-level method, the scheduler determines that the appropriate domain-level access permission is write access if the agent-level method is implemented by a writer agent, the scheduler determines that the appropriate domain-level access permission is read access if the agent-level method is implemented by a reader agent, and the scheduler determines that the appropriate domain-level access permission is no access if the agent-level method is implemented by a no-access agent, and
wherein if the creation source is an agent-level function, the scheduler determines that the appropriate domain-level access permission is read access if the agent-level function is implemented by a writer agent, the scheduler determines that the appropriate domain-level access permission is read access if the agent-level function is implemented by a reader agent, and the scheduler determines that the appropriate domain-level access permission is no access if the agent-level function is implemented by a no-access agent.

21. The computer program product in accordance with claim 20, the scheduler further configured to identify an appropriate agent-level access permission for the given component based on the creation source of the given component,
wherein if the creation source is an agent-level method, the scheduler determines that the appropriate agent-level access permission is write access regardless of whether the agent-level method is implemented by a write agent, a reader agent, or a no-access agent, and
wherein if the creation source is an agent-level function, the scheduler determines that the appropriate agent-level access permission is read access regardless of whether the agent-level method is implemented by a write agent, a reader agent, or a no-access agent.

22. A computer program product comprising one or more physical computer-readable storage media having thereon computer-executable instructions that, when executed by one or more processors of the computing system, cause the computing system to instantiate a scheduler,
the scheduler configured to schedule execution of a plurality of components in a dataflow network, each of the plurality of components being created using a domain/agent model in which data access boundaries are defined by one or more domains, and in which one or more agents are defined in each of at least one of the one or more domains,
the scheduler configured to identify, for each of the plurality of components, a creation source for the given component, possible creation sources including at least a domain-level method, a domain-level function, an agent-level method and an agent-level function;
the scheduler configured to identify, for each of the plurality of components, an appropriate domain-level access permission for the given component based on the creation source of the given component; and
the scheduler configured to determine, based at least on the identified appropriate domain-level access permission for at least two of the plurality of components, whether a particular component may concurrently execute with one or more other components of the plurality of components,
wherein if the creation source is an agent-level method,
the scheduler determines that the appropriate domain-level access permission is write access if the agent-level method is implemented by a writer agent,
the scheduler determines that the appropriate domain-level access permission is read access if the agent-level method is implemented by a reader agent, and
the scheduler determines that the appropriate domain-level access permission is no access if the agent-level method is implemented by a no-access agent; and
wherein if the creation source is an agent-level function,
the scheduler determines that the appropriate domain-level access permission is read access if the agent-level function is implemented by a writer agent,
the scheduler determines that the appropriate domain-level access permission is read access if the agent-level function is implemented by a reader agent, and
the scheduler determines that the appropriate domain-level access permission is no access if the agent-level function is implemented by a no-access agent.

23. A computer program product comprising one or more physical computer-readable storage media having thereon computer-executable instructions that, when executed by one or more processors of the computing system, cause the computing system to instantiate a scheduler,
- the scheduler configured to schedule execution of a plurality of components in a dataflow network, each of the plurality of components being created using a domain/agent model in which data access boundaries are defined by one or more domains, and in which one or more agents are defined in each of at least one of the one or more domains,
  - the scheduler configured to identify, for each of the plurality of components, a creation source for the given component, possible creation sources including at least a domain-level method, a domain-level function, an agent-level method and an agent-level function;
  - the scheduler configured to identify, for each of the plurality of components, an appropriate domain-level access permission for the given component based on the creation source of the given component;
  - the scheduler configured to determine, based at least on the identified appropriate domain-level access permission for at least two of the plurality of components, whether a particular component may concurrently execute with one or more other components of the plurality of components; and
- the scheduler further configured to identify, for each of the plurality of components, an appropriate agent-level access permission for the given component based on the creation source of the given component,
- wherein if the creation source is an agent-level method, the scheduler determines that the appropriate agent-level access permission is write access regardless of whether the agent-level method is implemented by a write agent, a reader agent, or a no-access agent, and
- wherein if the creation source is an agent-level function, the scheduler determines that the appropriate agent-level access permission is read access regardless of whether the agent-level method is implemented by a write agent, a reader agent, or a no-access agent.

* * * * *